United States Patent [19]

Mukae et al.

[11] Patent Number: 4,521,105
[45] Date of Patent: Jun. 4, 1985

[54] NEGATIVE FILM CARRIER FOR A DISC FILM

[75] Inventors: Toshiyuki Mukae; Yoshifumi Azuma, both of Wakayama, Japan

[73] Assignee: Noritsu Kenkyu Center Co., Ltd., Wakayama, Japan

[21] Appl. No.: 503,535

[22] Filed: Jun. 13, 1983

[30] Foreign Application Priority Data

Jun. 14, 1982 [JP] Japan ............................. 57-87321[U]

[51] Int. Cl.$^3$ ....................... G03B 27/32; G03B 27/52
[52] U.S. Cl. ......................................... 355/64; 355/76
[58] Field of Search ............................. 355/64, 75, 76

[56] References Cited

U.S. PATENT DOCUMENTS 4,203,664  5/1980  Clifton ................................. 355/64
4,204,733  5/1980  Modney et al. ....................... 355/64
4,443,100  4/1984  Zamek ................................. 355/64

Primary Examiner—Richard A. Wintercorn

[57] ABSTRACT

An improved negative film carrier for a disc film adapted to be mounted on a handling board in a photographic printer in which images on negative films fitted into a number of film frames arranged along the periphery of the disc film in an equally spaced relation are printed one by one onto a photographic printing paper as the disc film is intermittently turned, said handling board including an exposure opening formed thereon through which light beam passes, is disclosed, wherein the improvement consists in that the negative film carrier essentially comprises a negative film mask plate serving as a base section for mounting the negative film carrier on the handling board, an exposure opening of said negative film mask plate being located in vertical alignment with the exposure opening of the handling board, a negative film mask holder adapted to be fitted on the negative film mask plate and including a negative film mask portion of which exposure opening is located in vertical alignment with the exposure opening of the negative film mask plate, a disc film holder turnably supported on the negative film mask holder in parallel to the upper surface of the latter and including means for intermittently turning the disc film by an angular distance corresponding to one pitch of film frames and a negative film retainer holder adapted to turn about a support shaft on an extension part extending rearward of the negative film mask plate and including a mask-shaped negative film retainer plate fixedly secured to the bottom of the fore part thereof.

6 Claims, 11 Drawing Figures

NEGATIVE FILM CARRIER FOR A DISC FILM

BACKGROUND OF THE INVENTION

1. Field of the Invention

The present invention relates to a negative film carrier for a disc film which has been lately developed and has a tendency of increase in consumption in future and more particularly to an improved negative film carrier for a disc-shaped photographic film that is called disc film, said negative film carrier being adapted to be mounted in a photographic printer in which images on exposed negative films fitted into a number of film frames arranged along the periphery of the disc film are printed one by one onto a photosensitive printing paper, wherein the improvement is made in such a manner that the negative film carrier can be conveniently employed even in case of a few consumption and it may take the place of a conventional negative film carrier in a conventional photographic printer as required.

2. Description of the Prior Art

As is well known, a disc-shaped photographic film that is called disc film has been developed as a new photographic material for camera in recent years and is gradually taking the place of hitherto known long length photographic films in the form of a roll. The disc film is typically designed such that it has an outer diameter of about 6.5 cm and includes a fitting hole having an inner diameter of about 1 cm at the center and a number of film frames arranged along the periphery thereof in an equally spaced relation, said film frames being fitted with unexposed films. To meet the requirements for printing images of exposed films on a plurality of disc films onto a long length photographic printing paper automatically while they are exchangeably fitted onto a negative film carrier there were already made a few proposals with respect to negative film carrier for photographic printer as disclosed, for instance, in U.S. Pat. Nos. 4,203,664 and 4,204,733. However, it has been found that most of the conventional negative film carriers are designed and constructed with a large quantity of consumption in mind (as is the case with the conventional long length photographic films in the form of a roll) and therefore they are very complicated in structure but they are very expensive to be employed in case of low consumption as at present. As a result a photographic printer with the conventional negative film carrier for disc film incorporated therein is naturally expensive to be manufactured and therefore has problems from the viewpoint of practical utilization.

SUMMARY OF THE INVENTION

The present invention is concerned with an improved negative film carrier for a disc film which has been lately developed as a new photographic material but has a few consumption at present, wherein the improvement is made such that the negative film carrier is adapted to be mounted on a handling board in a photographic printer in which images on exposed and processed negative films fitted into a number of film frames arranged along the periphery of the disc film are printed one by one onto a photosensitive printing paper as the disc film is intermittently turned, said handling board including an exposure opening formed thereon through which light beam passes. Specifically, the improvement consists in that the negative film carrier essentially comprises a negative film mask plate serving as a base section for mounting the negative film carrier on the handling board in a photographic printer, an exposure opening of said negative film mask plate being located in vertical alignment with the exposure opening of the handling board, a negative film mask holder adapted to be fitted on the upper surface of the negative film mask plate and including a negative film mask portion of which exposure opening is located in vertical alignment with the exposure opening of the negative film mask plate, a disc film holder turnably supported on the negative film mask holder by means of a support shaft and including another support shaft for turnably holding a disc film and means for intermittently turning the disc film by an angular distance corresponding to one pitch of film frames, said first mentioned support shaft standing upright at the one corner of the disc film holder, and a negative film retainer plate adapted to turn up or down about a horizontally extending support shaft on the extension part extending rearward of the base plate of the negative film mask plate, said negative film retainer holder including a mask-shaped negative film retainer plate fixedly secured to the bottom surface of the fore part thereof with spring means disposed therebetween, said mask-shaped negative film retainer plate being formed with an exposure opening at the fore part thereof.

Thus, it is a principal object of the present invention to provide a negative film carrier for a disc film comprising a negative film mask plate, a negative film mask holder, a disc film holder turnably supported on said negative film mask holder and a negative film retainer holder so that it may take the place of a conventional negative film carrier in a conventional photographic printer for a long length photographic film that is called roll film without any necessity for arranging a photographic printer for particularly treating disc films.

It is another object of the present invention to provide a negative film carrier for a disc film which assures that a negative film mask in the conventional negative film carrier for roll films may be replaced with a negative film mask holder and a disc film holder in the negative film carrier of the invention for disc films so that an arrangement of a photographic printer for particularly treating disc films is not required in case where the conventional negative film carrier in the conventional photographic printer for so-called roll films is equipped with the same or similar negative film mask plate and negative film retainer holder as those in the negative film carrier for disc film of the invention.

It is other object of the present invention to provide a negative film carrier for a disc film which is designed and constructed in a different manner from the conventional complicated negative film carrier employed particularly for large quantity of disc films and therefore is simple in structure and can be easily handled without any necessity for highly trained skill.

Hence, the present invention consists in that the main body of a photographic printer may be employed not only for the conventional photographic printer for roll films but also for a photographic printer for disc films and therefore there is no necessity for arranging a photographic printer particularly for treating large quantity of disc films which is very complicated in structure and requires comparatively highly trained skill in view of the current few consumtion of disc films.

Other objects, features and advantages of the invention will be more clearly apparent from reading of the following description made in conjunction with the accompanying drawings.

BRIEF DESCRIPTION OF THE DRAWINGS

The accompanying drawings illustrate a preferred embodiment of the present invention, wherein insignificant parts and components well known to any expert in the art are not illustrated in the drawings for the purpose of simplification of illustration.

FIGS. 10 and 11 are a plan view of the negative film carrier for disc film of the invention respectively, illustrating how it is assembled, in which FIG. 10 is a plan view of a combination of the negative film mask holder and the disc film holder, wherein the latter is assembled on the former and supported turnable about a support shaft to the negative film mask plate, and FIG. 11 is a plan view of the negative film carrier of the invention, wherein the negative film retainer holder is finally mounted on the combination as illustrated in FIG. 10.

DESCRIPTION OF THE PREFERRED EMBODIMENT

As is well known, there has been lately developed a so-called disc film which is designed in the form of a disc and includes a number of photo-taking frames arranged along the periphery of the disc one after another in an equally spaced relation. However, the disc film has a few consumption at present but there is recognized a tendency of increase in consumption. Now, a negative film carrier for a disc film in accordance with the present invention will be described in a greater detail hereunder with reference to the accompanying drawings which illustrate a preferred embodiment of the invention, said disc film being adapted to be fitted onto a photographic printer so as to print images on the disc film onto a photosensitive printing paper after photographs are taken and the exposed disc film is subjected to developing treatment.

First, description will be made as to a photographic printer (hereinafter referred to simply as printer) assembled with negative film carrier with reference to FIG. 1 which schematically illustrates its construction, said printer serving to print images on the disc film onto a long length photosensitive printing paper.

Figure 1:
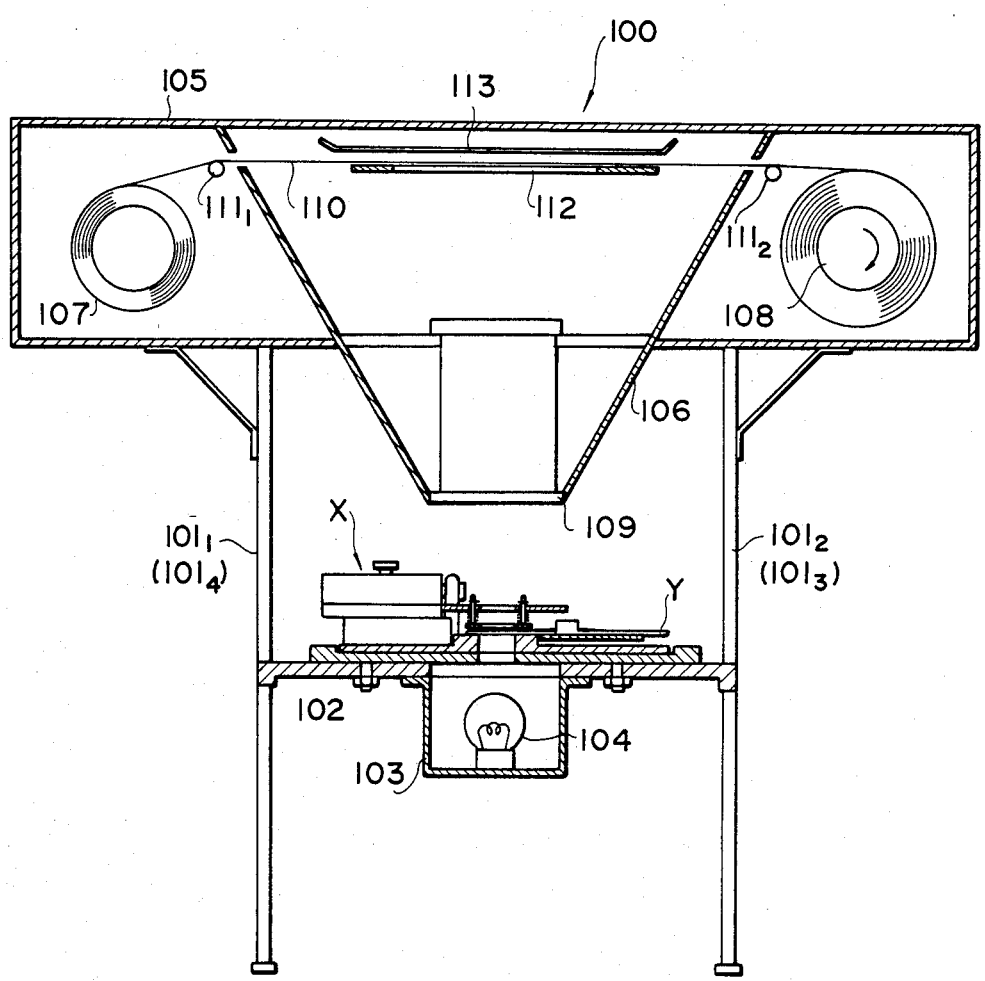
FIG. 1 is a schematic vertical sectional view of a photographic printer in which a negative film carrier of the invention is incorporated so as to print images on a disc film to a long length photographic printing paper.

In FIG. 1 reference numeral 100 designates a printer which includes columns $101_1$, $101_2$, $101_3$ and $101_4$ at the four corners and a lamp house 103 with a light source 104 contained therein, said lamp house 103 being attached to the bottom of a handling board 102 that is generally called desk. Further, the printer 100 includes a light beam shielding box 106 with a printing paper passage formed therein, said light beam shielding box 106 being mounted on the upper ends of the four columns $101_1$, $101_2$, $101_3$ and $101_4$ and having an inverted triangle shaped sectional configuration, so that the upper part of the printer 100 is divided into three chambers. One of the chambers, that is, the lefthand chamber as seen in the drawing includes an unreeling portion 107 with a roll of long length photosensitive printing paper 110 (hereinafter referred to simply as printing paper) unreelably carried thereon and a guide roller $111_1$ for guiding printing paper, the second one, that is, the right-hand chamber as seen in the drawing does a reeling portion 108 and another guide roller $111_2$ for guiding printing paper, and the last one, that is, the middle chamber does a printing paper mask 112 and a printing paper retainer 113. The above-mentioned chambers are defined by a dark box 105 and moreover a lens box 109 is fixedly attached to the bottom of the light shilding box 106 and a negative film carrier X for disc film of the invention is disposed below said lens box 109.

It should be noted that some of parts and components constituting the printer 100 are substantially same or similar to those in a conventional printer in which printing is effected for a long length photographic film with the exception of parts and components constituting the negative film carrier for disc film of the invention and therefore their description will not be required.

Figure 2:
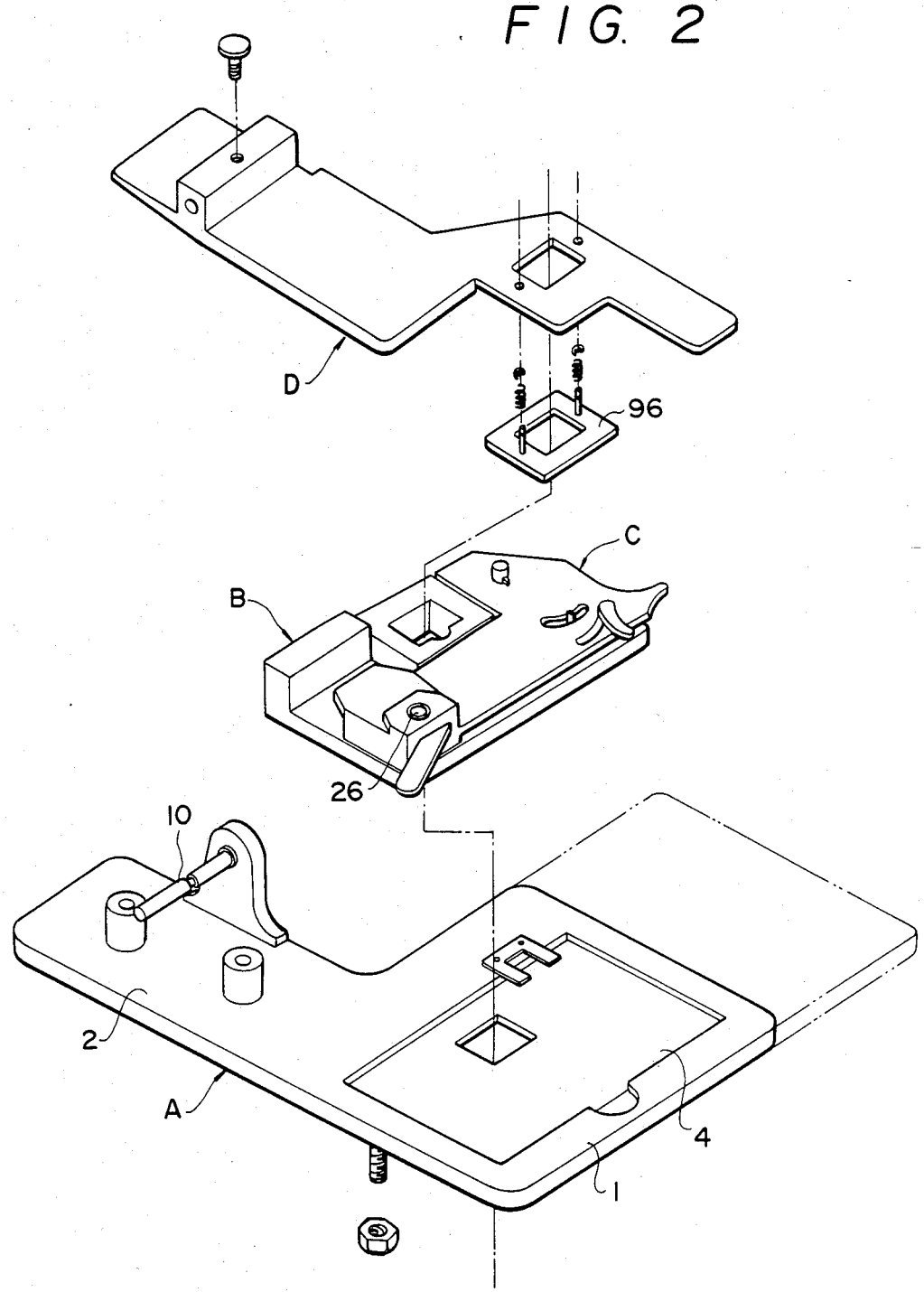
FIG. 2 is a perspective view of the negative film carrier for disc film of the invention, shown in a disassembled state.

As is apparent from FIG. 2, the negative film carrier X for disc film is constructed by a combination of a negative film mask plate A serving as a base therefor, a negative film mask holder B firmly fitted into a recess 4 on said negative film mask plate A, a disc film holder C turnably supported on a support shaft 26 standing upright at the one corner of said negative film mask holder B, said support shaft 26 serving to turn said disc film holder C thereabout, and a negative film retainer holder D adapted to turn about a support shaft 10 at the rear end part thereof, said support shaft 10 extending horizontally at the extension part 2 of the base plate 1 of the negative film mask plate A so as to turnably support said negative film mask holder D together with a mask-shaped negative film retainer 96 attached to the bottom of the fore end part of the latter.

Figure 3:
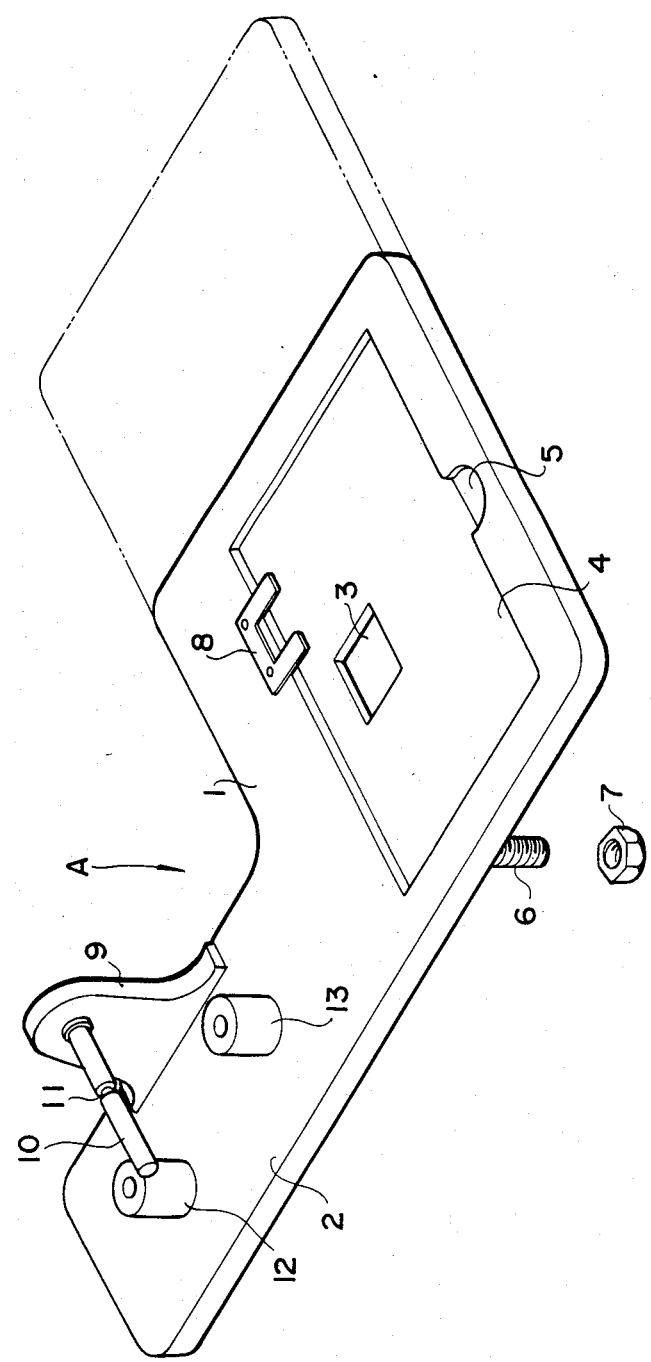
FIG. 3 is a perspective view of a negative film mask plate constituting an essential component of the negative film carrier for disc film of the invention, said negative film mask plate being adapted to be attached to a desk on the photographic printer.

Specifically, the negative film mask plate A comprises a base plate 1 as illustrated in FIG. 3 which includes an extension part 2 extending rearward as seen in the drawing, a rectangular exposure opening 3 formed thereon at the position located in alignment with the light source 104 in the lamp house 103 when it is mounted under the handling board 102, a recess 4 into which the negative film mask holder B is fixedly fitted with said exposure opening 3 located in alignment with the corresponding opening 22 on the negative film mask holder B, and a finger engagement recess 5 for disconnecting the negative film mask holder B from said recess 4 with the aid of an operator's finger. On the bottom of the base plate 1 are provided a plurality of male threaded pins 6 which serve to attach the base plate 1 onto the handling board 102 in cooperation with nuts 7, whereas on the upper surface of the base plate 1 are provided a negative film mask retaining leaf spring 8 and a bearing portion 9, said negative film mask holder retaining leaf spring 8 being attached to the base plate 1 in such a manner as to allow its fore part to project above the recess 4, while said bearing portion 9 standing upright at the one side of the extension part 2 to carry a support shaft 10 in a cantilever fashion in the horizontal direction on which the negative film retainer holder D is turnably supported with an occurance of lateral displacement thereof inhibited with the aid of a diameter reduced part 11 on the support shaft 10 to which a set screw (not shown) is engaged. Further, two electromagnets 12 and 13 are mounted at the positions located before and behind the support shaft 10 on the upper surface of the extension part 2 of the base plate 1 so that they are alternately magnetized to turn the negative film retainer holder D and thereafter firmly hold the latter. It should be noted that the electromagnets 12 and 13 have the substantially same height as that of a carrying block 25 on the negative film mask holder B which will be described later.

Next, description will be described in more details as to the negative film mask holder B adapted to be firmly fitted into the recess 4 on the base plate 1 with reference to FIG. 4. The negative film mask holder B is dimensioned in thickness appreciably more than the depth of the recess 4 and comprises a base plate 20 of which outer dimensions are determined so as to inhibit displacement thereof within the space as defined by the recess 4. The base plate 20 is formed with an exposure opening 22 located in alignment with the exposure opening 3 on the negative film mask plate A and a semicircular cutout 23 for identifying film frame numbers on the disc film Y (see FIGS. 5 and 10). Further, the base plate 20 includes a negative film mask portion 21 with a front wall 24 of which function will be described later, said negative film mask portion 21 having a flat upper surface, a carrying block 25 for holding the negative film retainer holder D in a horizontal posture, said carrying block 25 being located adjacent to the negative film mask portion 21 and having a height higher than that of the latter, a support shaft 26 for turnably supporting a disc film holder C in such a manner as described later, said support shaft 26 being located opposite to the one corner of the carrying block 25, and an engagement pin 27 of which function will be described later, said engagement pin 27 having the substantially same height as that of the negative film mask portion 21.

Next, the disc film holder C adapted to turn about the support shaft 26 disposed at the one corner of the negative film mask holder B will be described mainly with reference to FIGS. 4, 5, 6, 7 and 10 and additionally with reference to FIG. 8 which schematically illustrates a modified embodiment where the disc film holder C is modified in structure partially.

Figure 10:
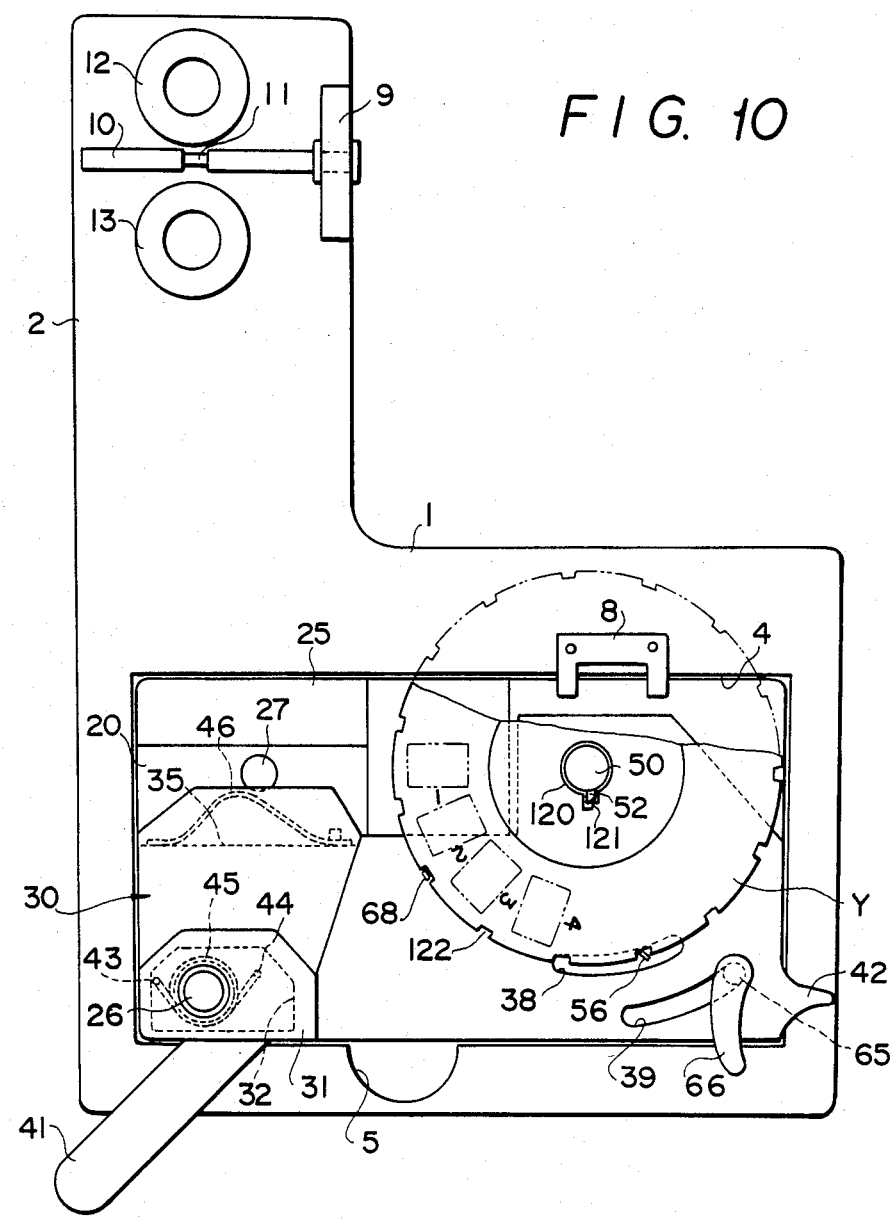

Reference numeral 30 designates a main plate which is formed with a recessed part 32 at the bottom surface thereof (see FIG. 10). Specifically, the main plate 30 includes a hub 31 with a bearing 33 fitted thereinto for the support shaft 26 about which the disc film holder C is caused to turn, a negative film retainer holder carrying portion 34 extending from said hub 31 to serve as an upper surface for horizontally carrying the negative film retainer holder D in cooperation with the carrying block 25, said negative film retainer carrying portion 34 having the substantially same height as that of the carrying block 25 and being formed with a cutout 35 at the lower part of the fore end thereof for preventing it from colliding against the negative film mask portion 21, and a support plate 36 extending sideward from the middle part of the side wall of both the hub 31 and the negative film retainer holder carrying portion 34 of which upper surface is substantially flush with the negative film mask portion 21, of which bottom surface is spaced from the base plate 20 by a consideraly wide clearance and of which front edge 37 is adapted to abut against the front wall 24 of the negative film mask portion 21, said support plate 36 including members by means of which the disc film Y is rotatably supported so as to displace film frames on the disc film Y one by one toward the exposure opening 22 on the negative film mask portion 21 of the negative film mask holder B and moreover being formed with a through opening 40 and arched through guide openings 38 and 39 through which said members extend upward. Further, the support plate 36 includes a lever 41 and a projection 42 both of which serve to turn the main plate 30.

To facilitate turning of the main plate 30 and firmly maintain the position where printing operation is performed spring members 45 and 46 are provided. Specifically, as is apparent from FIG. 10, the spring member 45 is disposed about the support shaft 26 in the recessed part 32 on the bottom of the hub 31 in such a manner that its one end part 43 is anchored at the base plate 20 of the negative film mask holder B and its other end part 44 is anchored at the hub 31 of the disc film holder C so as to generate rotational force for turning the main plate 30 in the clockwise direction as seen in the drawing, whereas as is apparent from FIGS. 4 and 10, the spring member 46 is designed in the form of an arched leaf spring of which one end part is anchored at the cutout 35 on the lower part of the fore end of the negative film retainer holder carrying portion 34 so as to firmly hold the main plate 30 at the position where printing operation can be performed after the main plate 30 is turned against resilient force of the spring member 45 to the aforesaid position in the anticlockwise direction as seen in FIG. 10 until the spring member 46 is engaged to the engagement pin 27 on the negative film mask holder B. Accordingly, resilient force of the spring member 45 is normally determined less than holding force by way of which the spring member 46 is engaged to the engagement pin 27.

Figure 4:
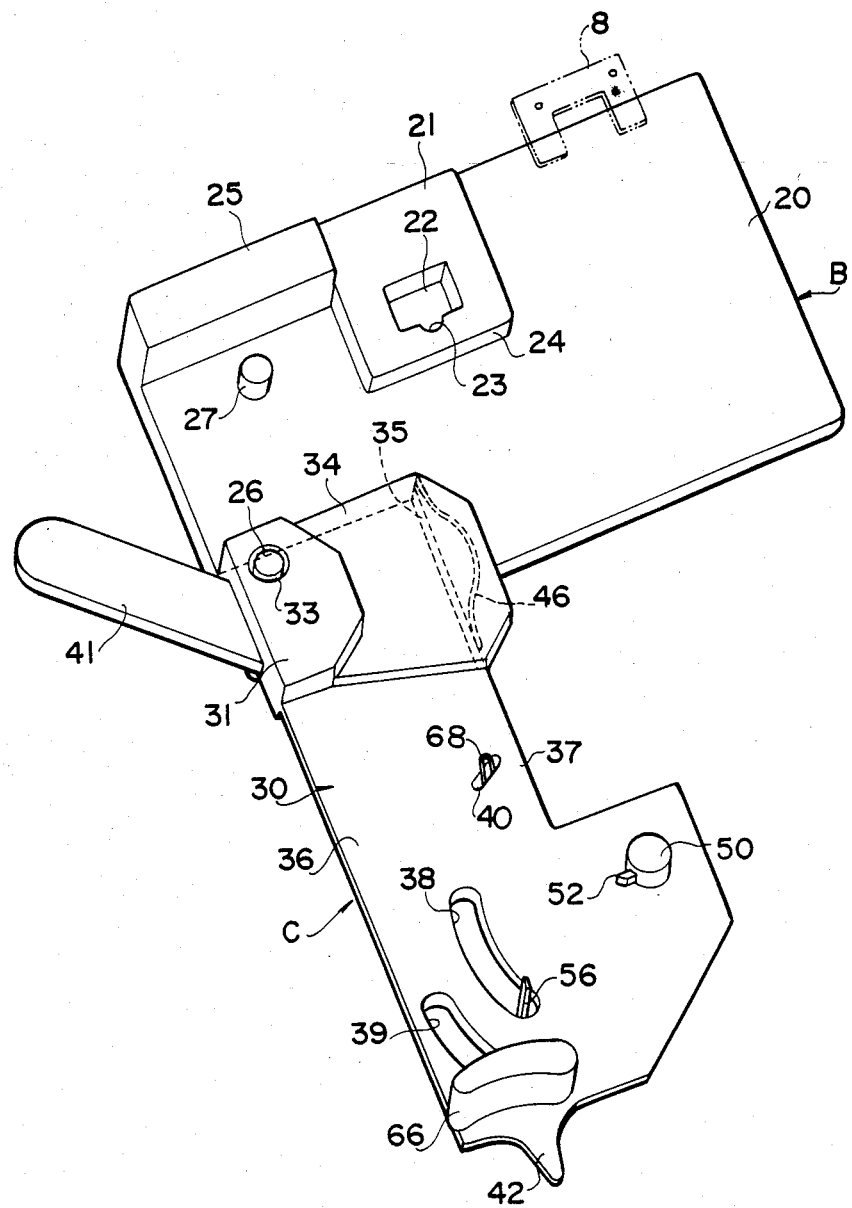
FIG. 4 is a perspective view of a combination of a disc film holder and a negative film mask holder, said disc film holder being supported turnable about a support shaft standing upright at the one corner of the negative film mask holder, shown at the position turned away from the negative film mask holder by 90 degrees.
Figure 5:
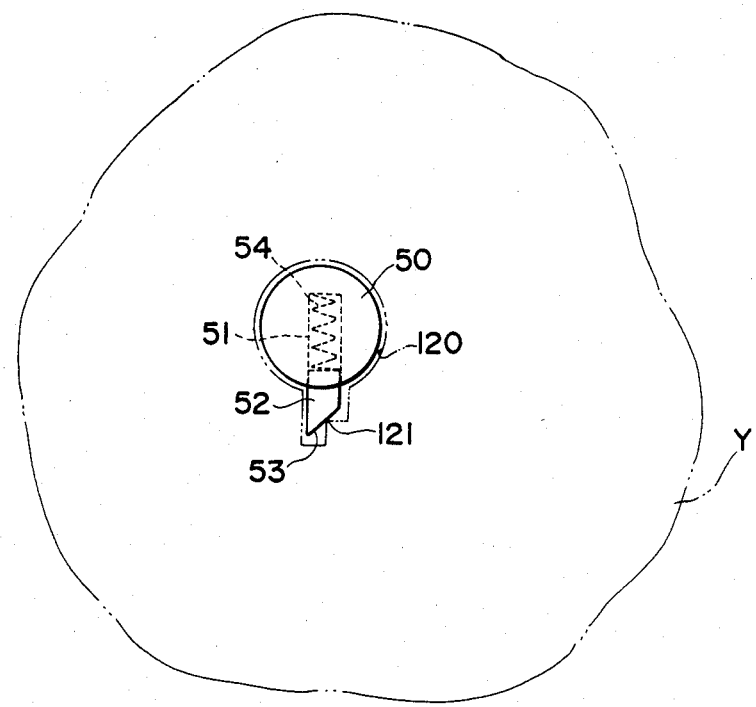
FIG. 5 is a partial plan view of a disc film fitted onto a support shaft standing upright on the disc film holder, shown in an enlarged scale.

As illustrated in FIG. 4, one of the support members for supporting the disc film Y is a disc film support shaft 50 which projects above the upper surface of the support plate 36 to be fitted into a key hole-shaped fitting hole 120 at the center of the disc film Y. Specifically, as is apparent from FIG. 5, the support shaft 50 has an engagement piece insert hole 51 formed at the upper part thereof, said engagement piece insert hole 51 extending in the direction of diameter of the support shaft 50 to receive therein an engagement piece 52 with a coil spring 54 disposed between the bottom of the insert hole 51 and the engagement piece 52 of which fore part includes an inclined surface 53 which is inclined in the direction of rotation of the disc film Y. When the disc film Y is fitted onto the support shaft 50 by inserting the latter through the key hole-shaped fitting hole 120 as illustrated in FIG. 5, the inclined surface 53 on the support shaft 50 is caused to abut against a shoulder 121 of the key hole-shaped fitting hole 120. Owing to the arrangement of a combination of the inclined surface 53 of the engagement piece 51 and the shoulder 121 of the key hole-shaped fitting hole 120 it is assured that the disc film Y is always fitted in the same posture without an occurance of reverse fitting. As the disc film Y is rotated, the engagement piece 52 is thrusted inward against resilient force of the coil spring 54 until it is completely involved in the engagement piece insert hole 51 whereby rotation of the disc film Y proceeds without particular hindrance encountered.

Next, the members for displacing film frames toward the exposure opening 22 on the negative film mask portion 21 of the negative film mask holder B one by one by turning the disc film Y will be described with reference to FIGS. 4, 6, 7 and 10.

Turning of the disc film Y by an angular distance corresponding to one pitch between the adjacent film frames is carried out by utilizing a plurality of recesses 122 formed along the periphery of the disc film Y in an equally spaced relation. Description will be made particularly with reference to FIGS. 4 and 10 as to how the disc film Y is intermittently turned. A vertically extending engagement piece 56 of a L-shaped feed ratchet 55 is projected above the support plate 36 through the arched through guide hole 38 to come in engagement to the recess 122 on the disc film Y during forward movement to turn the latter by an angular distance corresponding to one pitch of film frames, whereas it is caused to come out of engagement to the recess 122 during backward movement. Further, a backward movement prevention member 67 made of resilient material is adapted to sink in the through hole 40 on the support plate 36 during forward turning of the disc film Y and rise up above the support plate 36 when the engagement piece 56 comes close to the end point of forward movement cource so that it comes in engagement to the recess 122. Thus, a combination of the vertically extending engagement piece 56 and the backward movement prevention member 67 assures that incorrect movement of the disc film Y is inhibited.

Next, description will be made particularly with reference to FIGS. 6 and 7 as to how the vertically extending engagement piece 56 of the L-shaped feed ratchet 55 carries out circular movement and the backward movement prevention member 67 sinks or rises.

Figure 6:
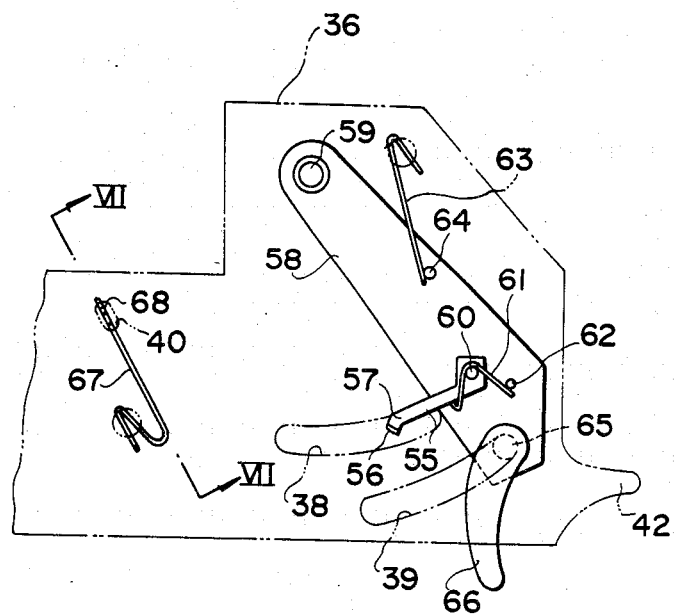
FIG. 6 is a partial view of the disc film holder, schematically illustrating at an enlarged scale a manual feed mechanism for intermittently turning a disc film by an angular distance corresponding to one pitch of film frames.
Figure 7:
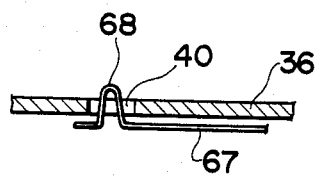
FIG. 7 is a partial sectional view of the disc film holder taken in line VII—VII in FIG. 6, particularly illustrating at an enlarged scale a backward movement prevention member.

In FIG. 6 reference numeral 59 designates a pivotal shaft by means of which an actuating plate 58 is turnably supported on the bottom of the support plate 36, reference numeral 60 does a pivotal pin by means of which a horizontal part 57 of the L-shaped feed rachet 55 is turnably supported to an actuating plate 58, and reference numeral 61 does a rod spring which is wound about the pivotal pin 60, one end of said spring 61 being anchored at the horizontal part 57 and the other end of the same being anchored at the pin 62 on the actuating plate 58, reference numeral 63 does a return spring for the actuating plate 58 of which one end is anchored at the bottom of the support plate 36 and of which other end, that is, free end is engaged to a pin 64 on the actuating plate 58 and reference numeral 65 does a knob pin on the actuating plate 58, said knob pin 65 extending upward through the arched through guide hole 39 to carry a knob 66 at the upper end part thereof above the support plate 36.

As the knob 66 is manually actuated to move along the arched track of the through guide hole 39, the actuating plate 58 is caused to turn about the pivotal shaft 59 against resilient force of the return spring 63 whereby the L-shaped feed ratchet 55 adapted to urge toward the support shaft 50 by means of the rod spring 61 initiates forward movement. During forward movement of the L-shaped feed ratchet 55 the vertically extending engagement piece 56 comes in engagement to the recess 122 on the disc film Y and the latter is then turned by an angular distance corresponding to one pitch of film frames, whereas during backward movement the engagement piece 56 is disengaged from the recess 122 against resilient force of the rod spring 61.

Referring to FIGS. 6 and 7 again, the backward movement prevention member 67 has one end which is anchored at the bottom of the support plate 36 and the other end, that is, free end which is bent to the inverted U-shaped configuration to constitute an engagement piece 68 adapted to extend through the hole 40 to rise above the support plate 36 or sink below the latter. While the disc film Y is held immobile, the engagement piece 68 is brought in engagement to the recess 122 on the disc film Y and as the latter is turned, it is forcibly disengaged therefrom.

Figure 8:
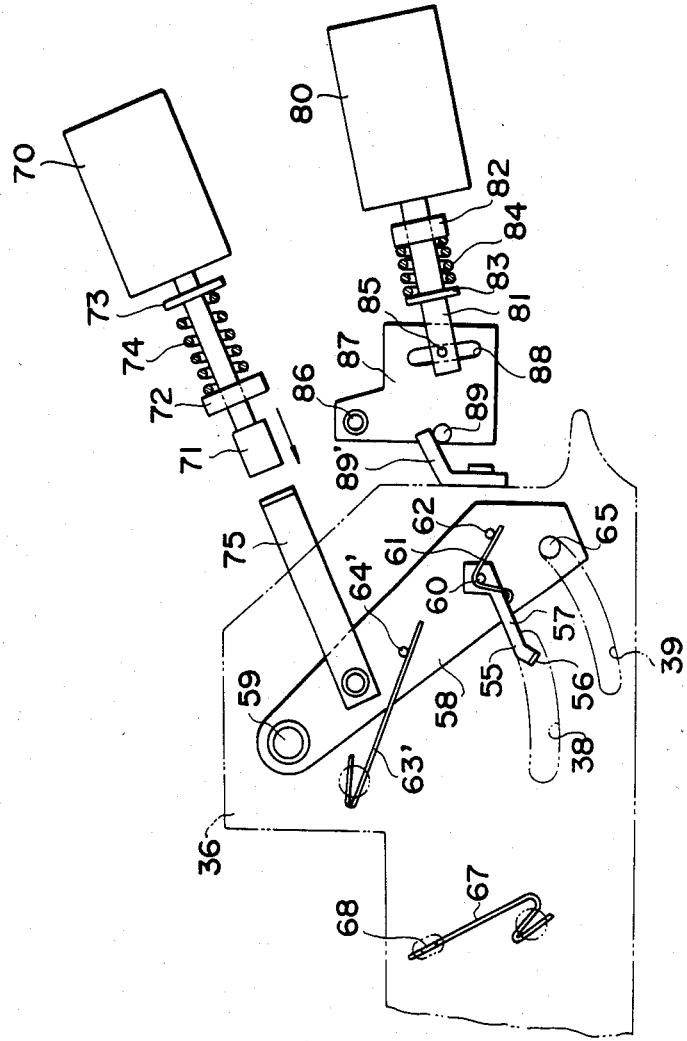
FIG. 8 is a partial view of the disc film holder, schematically illustrating at an enlarged scale a solenoid operated feed mechanism for intermittently turning a disc film by an angular distance corresponding to one pitch of film frames.

In the foregoing embodiment circular movement of the vertically extending engagement piece 56 of the L-shaped feed ratchet 55 is carried out with the aid of the knob 66 by manual operation but the engagement piece 56 may be automatically driven by operating solenoid means in such a manner as illustrated in FIG. 8. It should be noted that the same or similar parts and components as those in FIG. 6 are identified with the same reference numerals and their repeated description is neglected for the purpose of simplification.

In FIG. 8 reference numeral 70 designates a push solenoid and reference numeral 80 does a pull solenoid. Both of said solenoids 70 and 80 are fixedly mounted on an extension plate extending from the base plate 1 of the negative film mask plate A, as represented by two dott-chain lines in FIGS. 2 and 3. A slide rod 71 of the push solenoid 70 is slidably supported by means of a bearing 72 and a return coil spring 74 is disposed between the bearing 72 and the collar 73 firmly fitted on the slide rod 71, whereas a slide rod 81 of the pull solenoid 80 is slidably supported by means of a bearing 82 and a return coil spring 84 is disposed between the bearing 82 and the collar 83 firmly fitted on the slide rod 81.

Reference numeral 75 designates an abutment piece pivotally secured to the actuating plate 58. As the push solenoid 70 is magnetized, the slide rod 71 is caused to move forward against resilient force of the return coil spring 74 until it abuts against the abutment piece 75 and then the actuating plate 58 is turned about the pivotal shaft 59 in the clockwise direction as seen in the drawing together with the L-shaped feed ratchet 55 against resilient force of the return leaf spring 63' under the influence of cooperation of both the slide rod 71 and the abutment piece 75. On the contrary, as the push solenoid 70 is demagnetized, the original position as illustrated in FIG. 8 is restored by means of the return coil spring 74 and the return leaf spring 63'.

On the contrary, the slide rod 81 includes pin 85 projecting from the fore end part thereof which is engaged to an elongated hole 88 on a swing plate 87 which is supported turnably about a support shaft 86 and an engagement pin 89 on the swing plate 87 is adapted to come in engagement to an engagement member 89' secured to the support plate 36 or come out of engagement from the same whereby the disc film holder C is held immobile as illustrated in FIG. 8 or it is caused to turn in the clockwise direction as seen in the drawing. Accordingly, in case when the automatic actuating system as described above is employed, the engagement pin 27 on the negative film mask holder B and the leaf spring 46 on the disc film holder C are not required. As the solenoid 80 is magnetized after completion of intended printing operation, engagement of the engagement pin 89 to the engagement member 89' is interrupted and thereby the disc film holder C assumes the inoperative position as illustrated in FIG. 4 with the aid of resilient force of the spring 45.

Figure 9:
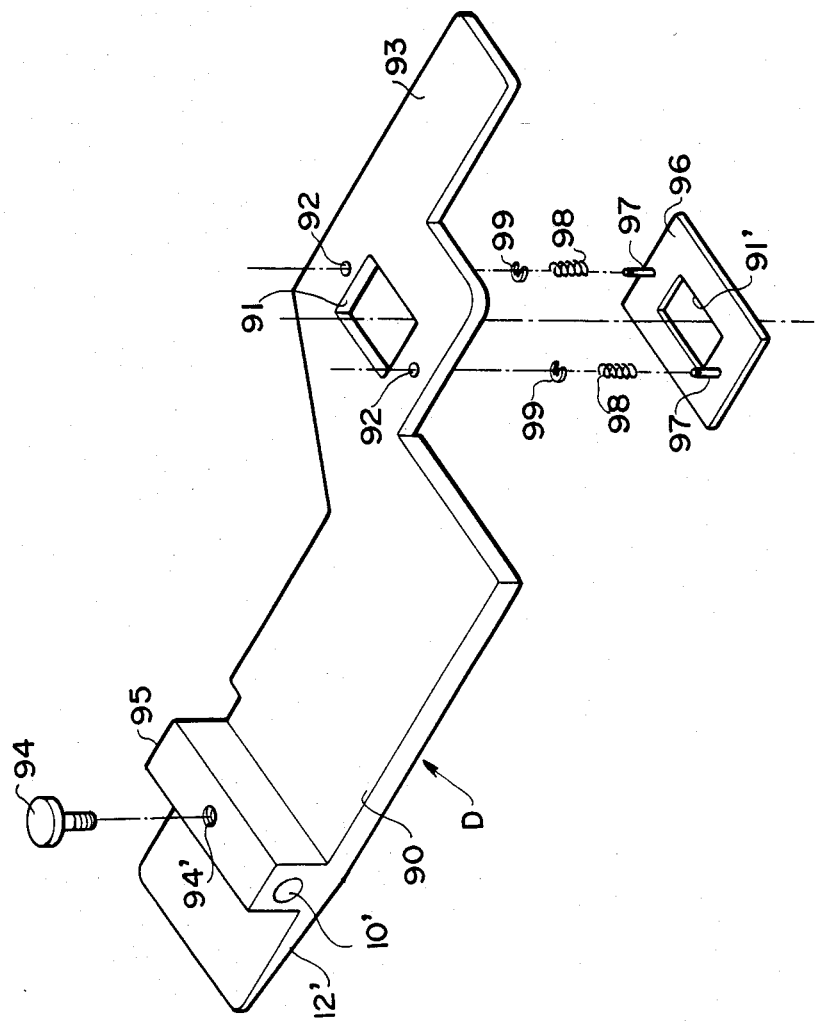
FIG. 9 is a perspective view of a negative film retainer holder constituting another essential component of the negative film carrier for disc film of the invention.

Next, the negative film retainer holder D turnably supported on the support shaft 10 horizontally extending above the extension part 2 of the base plate 1 of the negative film mask plate A will be described mainly with reference to FIG. 9 and additionally with reference to FIGS. 2 and others.

The negative film retainer holder D is adapted to turn up or down about the support shaft 10 as the electromagnet 12 or 13 is magnetized so that an intended operational position is assumed. Thus, the disc film Y fitted onto the support shaft 50 on the support plate 36 constituting the main plate 30 of the disc film holder C in such a manner that a certain film frame on the disc film Y is correctly located in alignment with the exposure opening 22 on the negative film mask portion 21 of the base plate 20 of the negative film mask holder B is firmly held at the exposing position or it is ready to be turned by an angular distance corresponding to one pitch of film frames.

Further, the negative film retainer holder D includes an exposure opening 91 located in alignment with the exposure opening 22 on the negative film mask holder B, fitting holes 92 for attaching a mask-shaped negative film retainer plate 96 which will be described later and a depressing projection 93 for manually handling the negative film retainer holder D, each of them being arranged on the fore part thereof. The bottom surface 12' of the rear end part of the negative film retainer holder D located opposite to the electromagnet 12 is inclined upward in the rearward direction, whereas on the upper surface of the same is provided a boss 95 which includes an insert hole 10' through which the support shaft 10 is inserted and a female threaded hole 94' through which a set screw 94 is extended until it reaches the diameter reduced part 11 on the support shaft 10 for the purpose of preventing the negative film retainer holder D from displacing in the transverse direction. Specifically, the negative film retainer holder D comprises a turn plate 90 on which fitting holes 92 and an exposure opening 91 having the substantially same configuration as that of the exposure opening 22 on the negative film mask holder B are formed. The mask-shaped negative film retainer plate 96 is attached to the bottom of the fore part of the turn plate 90 by inserting pins 97 on the retainer plate 96 through the fitting holes 92 with coil springs 98 disposed therebetween and then fitting E-shaped snap rings 99 around the pins 97 at their upper end part. As is apparent from FIG. 9, the exposure opening 91' on the retainer plate 96 has the same configuration as that of the exposure opening 91 on the fore end part of the turn plate 90.

Figure 11:
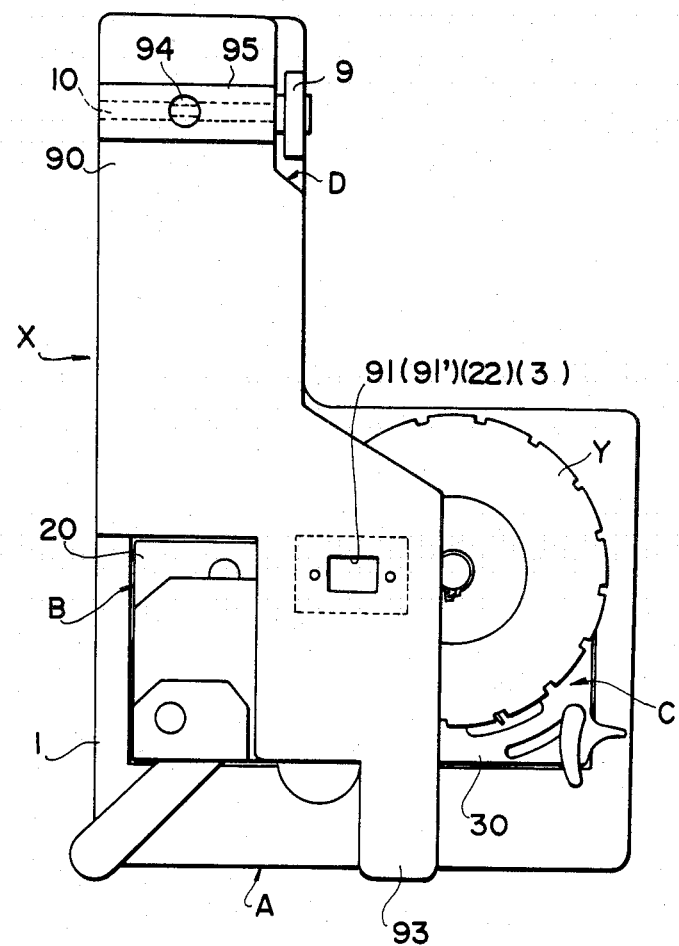

Next, description will be made as to how the negative film mask plate A, the negative film mask holder B, the disc film holder C and the negative film retainer holder D are assembled to constitute the negative film carrier X for disc film of the invention. As illustrated in FIG. 4, the disc film holder C is first turnably mounted on the negative film mask holder B with the aid of the support pin 26 on the latter about which the disc film holder C is caused to turn until the leaf spring 46 on the latter abuts against the engagement pin 27 on the negative film mask holder B. Next, as illustrated in FIG. 10, the base plate 20 of the negative film mask holder B is fitted into the recess 4 on the negative film mask plate A while it is firmly depressed by means of the negative film holder retaining leaf spring 8. Finally, the negative film retainer holder D is mounted on the negative film mask plate A by inserting the support pin 10 on the extension part 2 of the negative film mask plate A into the insert hole 10' on the boss 95 of the negative film retainer holder D and screwing the set screw 94 through the female threaded hole 94' until the fore end part of the set screw 94 is engaged to the diameter reduced part 11 on the support shaft 10. Thus, the negative film retainer holder D is mounted on the negative film mask plate A in such a manner that the former is turned up or down with respect to the latter without an occurance of lateral movement of the former on the support shaft 10. Now, the negative film carrier X has been assembled as illustrated in FIG. 11.

After completion of assemblying of the disc film carrier X of the invention in the above-described manner it is fixedly mounted on the handling board 102 of the printer 100 with the aid of a combination of the male threaded shafts 6 extending downward from the bottom of the base plate 1 of the negative film mask plate A and the corresponding nuts 7 as illustrated in FIG. 1. Now, the printer 100 is ready to be operated.

Next, operation of the negative film carrier X in the above-mentioned manner will be described below.

First, a switch (not shown) for the electromagnet 12 is turned on to magnetize it. The inclined rear surface 12' of the turn plate 90 of the negative film retainer holder D is displaced downward by magnetic attractive force generated by the electromagnet 12 and thereby the exposure opening 91 on the turn plate 90 located opposite to the inclined surface 12' is raised up so that there is developed a certain clearance between the negative film retainer holder D and the disc film holder C. Then, the latter is turned from the negative film mask holder B by 90 degrees as illustrated in FIG. 4. Now, the disc film Y is ready to be fitted onto the support shaft 50 with the aid of the engagement piece 52. After completion of correct fitting of the disc film Y the disc film holder C is turned back against resilient force of the spring member 45 by operating the lever 41 or the projection 42 until the spring member 46 abuts against the engagement pin 27 to assume the position as illustrated in FIG. 11 where a certain film frame on the disc film Y is located in vertical alignment with the exposure opening 22 on the negative film mask holder B. The electromagnet 12 is then demagnetized and the negative film retainer holder D is depressed by operating the depressing projection 93 as required so that the disc film Y is firmly held by means of the mask-shaped negative film retainer plate 96 so as to confirm through the exposure openings 91 and 91' whether the disc film Y is properly located or not. Next, when a switch (not shown) for the electromagnet 13 is turned on to displace the negative film retainer holder D downward, the disc film Y is resiliently clamped between the negative film mask portion 21 and the mask-shaped negative film retainer plate 96. Now, printing operation is ready to start.

After completion of printing the electromagnet 13 is demagnetized and at the same time the electromagnet 12 is magnetized so that the negative film retainer holder D is displaced upward. The actuating plate 58 is then actuated by operating the knob 66 or the push solenoid 70 whereby the vertically extending engagement piece 56 of the L-shaped feed ratchet 55 is brought in engagement to the recess 122 on the disc film Y to turn the latter by an angular distance corresponding to one pitch of film masks.

Printing operations proceed by repeating the above-mentioned steps of handling. After a series of printing operations are completed, the disc film holder C is drawn out to replace the disc film Y with another one. Then, the above-mentioned steps of handling are repeated.

As will be readily understood from the above description, a negative film carrier for a disc film in accordance with the present invention is constituted by an assembly of a negative film mask plate A, a negative film mask holder B, a disc film holder C and a negative film retainer holder D and therefore it can be very easily employed for a conventional photographic printer merely by replacing a conventional negative film carrier for roll films with the negative film carrier of the invention and attaching the latter onto a handling board that is called printer disk with the aid of a combination of male threaded shafts extending downward from the bottom of the negative film mask plate and corresponding nuts.

In case where the conventional negative film carrier includes the same or similar negative film mask plate and negative film retainer holder as the negative film mask plate A and the negative film retainer holder D constituting the negative film carrier of the invention, only a requirement is that a negative film mask on the conventional negative film carrier is replaced with the negative film mask holder B and the disc film holder C on the negative film carrier of the invention.

Further, since the negative film carrier X for disc film of the invention is constructed such that the disc film holder C includes a L-shaped feed ratchet 55 with an engagement piece 56 extending vertically therefrom and a rearward movement prevention member 67 both of which are adapted to come in engagement to or out of engagement from one of recesses 122 formed along the periphery of the disc film Y, said engagement piece 56 being reciprocably displaced along an arched through guide hole 38 on the disc film holder C by means of an actuating plate 58 turnably supported on the bottom of the disc film holder C to reciprocably displace a horizontal part 57 of the L-shaped feed ratchet 55 and said backward movement prevention member 67 being adapted to rise above or sink below the the disc film holder C through an through opening 40, so that the disc film Y is intermittently turned by an angular distance corresponding to one pitch of film frames by utilizing the recesses 122 equally spaced along the periphery of the disc film Y, there is no necessity for arranging a complicated gear transmission mechanism or the like as is the case with the conventional photographic printer for photographically treating disc films.

Finally, it can be concluded that the present invention has proposed a new negative film carrier for a disc film which is simple in structure, is easy to be handled, can be employed also for a conventional photographic printer for photographically treating roll films and moreover can be inexpensively used for photographically treating small quantity of disc films.

While the present invention has been described above only with respect to a preferred embodiment, it should be of course understood that it should not be limited only to this but various changes or modifications may be made without any departure from the spirit and scope of the invention.

What is claimed is:

1. A negative film carrier for a disc film having notches at its outer periphery for defining a boundary between adjacent film pieces, said carrier to be used by mounting it on a handling board of a photographic printer, said carrier comprising:

a negative film mask plate adapted to be removably mounted on said handling board, said negative film mask plate having a holding recess on the upper surface thereof and an exposure opening formed within said recess and adapted to overlap with a light projecting aperture formed in said handling board;

a negative film mask holder detachably fitted into said holding recess in a manner immovable in a horizontal direction, said negative film mask holder having a pivoting pin erected thereupon and an exposure opening intercommunicated with said exposure opening of said negative film mask plate;

a disc film holder having a film supporting shaft and a film turning means for turning said disc film to feed negative film pieces on said exposure opening one by one, said turning means including an actuating plate pivotally supported on said holder and a feed ratchet adapted to be driven by said actuating plate to forward said disc film by engagement of said ratchet with one of said notches formed at the outer periphery of said disc film, said disc film holder being supported by said pivoting pin on said negative film mask holder so as to be rotatable about said pivoting pin between one position overlaid on said negative film mask holder to be adapted for printing and another position being displaced to be protruded sidewardly of said negative film mask holder for facilitating the mounting and unloading of said disc film on said shaft; and a negative film retainer holder pivotally supported by a horizontal shaft mounted on said negative film mask plate, said negative film retainer holder having a mask-shaped retainer and being adapted for rocking motion about said shaft to allow said retainer to be moved against and away from said disc film.

2. A negative film carrier as defined in claim 1, wherein said negative film mask plate is adapted to be mounted on said handling board by means of a combination of male threaded shafts projecting downwardly from the bottom surface of said plate and respective nuts, said shafts being capable of being inserted into holes formed in said handling board.

3. A negative film carrier as defined in claim 1, wherein said exposure opening in said negative film mask holder is a portion raised up from the flat base surface of said negative film mask holder.

4. A negative film carrier as defined in claim 1, wherein said actuating plate is adapted to be moved by a manually operative knob in the forward direction and is returned by a spring bias to said actuating plate.

5. A negative film carrier as defined in claim 1, wherein said disc film holder further includes a backward movement prevention member adapted for engagement with said notches and to allow slipping out from said notches when said disc film is moved.

6. A negative film carrier as defined in claim 1, wherein a pair of electromagnets are disposed on said negative film mask plate, one magnet each on opposite sides of said shaft and adapted to cause rocking motion of said negative film retainer holder by alternative energization of said magnets.

* * * * *